United States Patent
Sierakowski-Larsen et al.

(10) Patent No.: US 11,067,086 B2
(45) Date of Patent: Jul. 20, 2021

(54) CENTRIFUGAL PUMP

(71) Applicant: GRUNDFOS HOLDING A/S, Bjerringbro (DK)

(72) Inventors: Janus Lukas Sierakowski-Larsen, Langå (DK); Ejgil Koustrup, Viborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 774 days.

(21) Appl. No.: 15/586,501

(22) Filed: May 4, 2017

(65) Prior Publication Data

US 2017/0328366 A1  Nov. 16, 2017

(30) Foreign Application Priority Data

May 12, 2016 (EP) ..................... 16169298

(51) Int. Cl.
| | |
|---|---|
| *F04D 9/02* | (2006.01) |
| *F04D 9/00* | (2006.01) |
| *F04D 15/00* | (2006.01) |
| *F04D 13/16* | (2006.01) |
| *F04D 1/06* | (2006.01) |
| *F16K 7/17* | (2006.01) |

(52) U.S. Cl.
CPC ............. *F04D 9/02* (2013.01); *F04D 1/06* (2013.01); *F04D 9/005* (2013.01); *F04D 13/16* (2013.01); *F04D 15/0005* (2013.01); *F04D 15/0011* (2013.01); *F16K 7/17* (2013.01)

(58) Field of Classification Search
CPC ... F04D 9/02; F04D 1/06; F04D 9/005; F04D 13/16; F04D 15/0005; F04D 15/0011; F16K 7/12; F16K 7/17
See application file for complete search history.

(56) References Cited

U.S. PATENT DOCUMENTS

2012/0251308 A1  10/2012  Mikkelsen et al.

FOREIGN PATENT DOCUMENTS

| CN | 102720676 A | 10/2012 | |
|---|---|---|---|
| CN | 102734176 A | 10/2012 | |
| CN | 203161557 U | 8/2013 | |
| CN | 203441763 U | 2/2014 | |
| CN | 204402911 U | 6/2015 | |
| EP | 0 718 501 A1 | 6/1996 | |
| EP | 1 013 936 A1 | 6/2000 | |
| EP | 0718501 B1 * | 3/2001 | .......... F04D 15/0011 |
| EP | 1729009 B1 | 12/2006 | |
| EP | 2730826 A1 | 5/2014 | |
| RU | 592 U1 | 7/1995 | |
| SU | 1333753 A1 | 8/1987 | |

* cited by examiner

*Primary Examiner* — David E Sosnowski
*Assistant Examiner* — Sabbir Hasan
(74) *Attorney, Agent, or Firm* — McGlew and Tuttle, P.C.

(57) ABSTRACT

A centrifugal pump (7), with one or more pumping stages, includes a pressure controlled valve (15) inside the pump (7) for supporting self-priming, the pressure controlled valve (15). The pressure controlled valve (15) includes a pretensioned leaf spring (17) and a valve seat (18). The leaf spring (17) has an opened position and a closed position. In the open position the leaf spring (17) is distanced from the valve seat (18). In the closed position the leaf spring (17) closes the valve seat (18). The leaf spring (17) and valve seat (18) are arranged for soft closing.

15 Claims, 9 Drawing Sheets

CENTRIFUGAL PUMP

CROSS REFERENCE TO RELATED APPLICATIONS

This application claims the benefit of priority under 35 U.S.C. § 119 of European Application 16 169 298.3 filed May 12, 2016, the entire contents of which are incorporated herein by reference.

FIELD OF THE INVENTION

This invention concerns a centrifugal pump with one or more pumping stages with a pressure controlled valve inside the pump for supporting self-priming.

BACKGROUND OF THE INVENTION

Centrifugal pumps as such are not self-priming. For making them self-priming an auxiliary construction is needed which ensures that some liquid remains in the pump, especially around the impeller to have a self-priming effect when starting.

Most common self-priming devices for centrifugal pumps are based on a bypass valve which is a pressure controlled valve and which is based either on a plunger or on a leaf spring. The downside of a pressure controlled valve based on a plunger is that there are a lot of components which are costly in construction and production and which are susceptible to problems (plunger, coil spring, sealing and valve seat). Insofar much easier is a leaf spring valve as there is only one moving part which is the leaf spring. This leaf spring valve is cheap and robust. It needs a simple valve seat which can be an integrated part of the pump, e.g. chamber or inlet part and having a leaf spring.

Although the leaf spring valve is simple, robust and cheap, it has one disadvantage, which may cause problems especially if the pump is integrated into an in-house water supply, for example in a domestic water works. This leaf spring generates a loud clack noise partially a sudden abrupt change in pressure across the valve due to shutting of the valve results in a water hammer occurrence. There is also caused noise by the leaf spring when the leaf spring meets with high velocity to the valve seat.

This loud clack is not present or controllable in the plunger valve solution as it has a coil spring which in progression with the closing sequence of the valve produces a counter force that slows the closing.

There are known approaches to avoid the clack on the closing. One as described could be using of the plunger concept, another is to avoid large differences in pressures. The last one could be done by placing the bypass higher up the pressure for instance by placing the valve in higher chamber on multistage pump. In this case, the difference in pressure acting across the bypass would be lower adding less momentum/energy to valve, however, higher the chamber the worse efficiency of self-priming. A different option is to decrease the flow around the bypass but as before, this will also reduce the efficiency of self-priming.

The existing solution for multi staged pumps uses a leaf spring solution typically mounted between inlet and outlet of the pump, which results in highest possible pressure difference over the valve generating very loud clack.

A centrifugal pump with a pressure controlled valve inside the pump for supporting self-priming which comprises a pretensioned leaf spring is known from the pump type Grundfos CM selfprime.

SUMMARY OF THE INVENTION

It is an object of this invention to create a self-priming centrifugal pump with a robust and cheap pressure controlled valve for supporting self-priming which avoids the disadvantage in noise of known leaf spring valves.

According to the invention there is a centrifugal pump with one or more pumping stages, with a pressure controlled valve inside the pump for supporting self-priming, the valve comprising a pretensioned leaf spring and a valve seat, the leaf spring having an opened position and a closed position. In the open position the leaf spring is distanced from the valve seat, in the closed position the leaf spring closes the valve seat. The leaf spring and valve seat are arranged for soft (dampened) closing.

The main aspect of this invention is to use a simple, robust and inexpensive leaf spring valve which is constructed such that the valve does not produce such a loud clack noise when closing. According to the invention this is realized by arranging the leaf spring with respect to the valve seat for soft (dampened) closing, which means that there the valve comprises dampening means which slows the leaf spring before meeting the valve seat, before completely closing the valve. There are several possibilities for the dampening means according to the invention to do this (slow the leaf spring before meeting the valve seat) which are in the following description and the figures.

This soft closing—dampened closing—according to the invention can be achieved by arranging a preclosed position for the leaf spring in which the valve is partially closed. In this preclosed position the leaf spring remains a very short time before moving to the completely closed position. Depending on the pressure differences at both sides of the valve this short time in which the leaf spring holds a preclosed position may be preferably between 50-500 milliseconds.

This preclosed position must not necessarily be a fixed position, this could also be a region before the leaf spring reaches the completely closed position.

According to the invention the valve is arranged with the leaf spring having at least one inherent stable position which is the pretensioned opened position. In the preclosed and closed position the leaf spring is tensioned and forced by fluid forces. This tension is in the opposite direction of the pretension of the leaf spring in the opened position.

According to the invention the leaf spring may have two inherent stable positions, the opened position and the closed position. The leaf spring is held in the closed position by fluid forces, especially the differential pressure at the valve. This position is defined by the leaf spring sitting on the valve seat.

According to a further embodiment of the invention the leaf spring may have a semi stable position which is the preclosed position. This semi stable position is preferably obtained by fluid forces. Semi stable means that this position or this region of positions is not inherent stable but will be reached at least for a short while when moving the leaf spring from the opened position to the closed position. Typically in this preclosed position the movement of the leaf spring is slowed down.

This soft closing—dampened closing—according to the invention may be achieved by arranging the valve seat off-center with respect to the support of the leaf spring. The leaf spring is moved from the opened position to the preclosed position by fluid forces. When the leaf spring moves from its pretensioned opened position in the direction to the closed position the main force has to impact on the middle of the leaf spring. When the leaf spring is narrowing to the closed position it reaches the preclosed position in which the forces have to move from the center/middle of the leaf spring to a region next to the center/middle of the leaf spring to move the leaf spring. The fluid which runs through the valve seat, causes the forces to move the leaf spring from the preclosed position to the closed position. As higher forces are necessary to move the leaf spring from the preclosed position to the closed position the movement slows down. As the fluid forces do not change abruptly this means that the movement of the leaf spring is slowed down. This has the effect that the leaf spring smoothly reaches the valve seat and does not occur a big noise when completely closing the valve.

For soft closing—dampened closing—according to the invention there may be arranged a stopping seat surrounding the valve seat which contacts the leaf spring in a preclosed position. This stopping seat may be for example an intermittent ring of force absorbing material or may be one or more shock absorbing means arranged around the valve seat.

Further the dampening means for soft closing—dampened closing—may be arranging the valve seat in an angle to a plan parallel to the support of the leaf spring. This angle may preferably between 5° to 20°. This arrangement causes the leaf spring to contact the valve seat from one side of the circumference to the diametrically opposed side which means that the leaf spring does not abruptly contact the valve seat but slowly from one side to the other side. As the valve seat is inclined with respect to the usual position of the valve seat which is perpendicular to the moving direction of the leaf spring the force to move the leaf spring from the preclosed position to the closed position has to increase which means that the movement of the leaf spring is slowing down during closing the valve seat completely.

According to a further alternative embodiment of the invention the valve seat is arranged in the distance from the leaf spring in its preclosed position, which also can be used to have a soft closing—dampened closing.

A dampening means for forcing the valve to soft closing—dampened closing—may be a bypass in parallel to the valve which bypass is closed by the leaf spring in a preclosed position. As the forces to move the leaf spring from the opened position to the preclosed position to the closed position are caused by fluid forces, these forces will be reduced as soon as the preclosed position is reached, as this bypass in parallel to the valve is closed and the fluid flow is reduced. Because of this reduced flow there is also a reduced force which closes the leaf spring and which moves the leaf spring from the preclosed position to the closed position.

For slowing down the movement of the leaf spring before completely closing the valve there may be arranged one or more shock absorbers between the leaf spring and the valve seat so that in the preclosed position the shock absorber or the shock absorbers come into contact with the valve seat or the leaf spring respectively. In the closed position they are pressed together so that the leaf spring completely closes the valve seat.

The centrifugal pump according to the invention may be preferably a multistage pump, the pressure controlled valve preferably arranged between the inlet and outlet of the pump. This arrangement is very effective as the differential pressure between inlet and outlet of the pump is the highest differential pressure in the pump. This means that the valve is closed with higher forces and arranged at the beginning of the fluid path through the pump which supports the self-priming effect.

Advantageously this centrifugal pump according to the invention is arranged in a water works for supporting a water supply for a house, preferably in a domestic water works.

The invention is hereinafter explained in more detail by way of embodiment examples represented in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
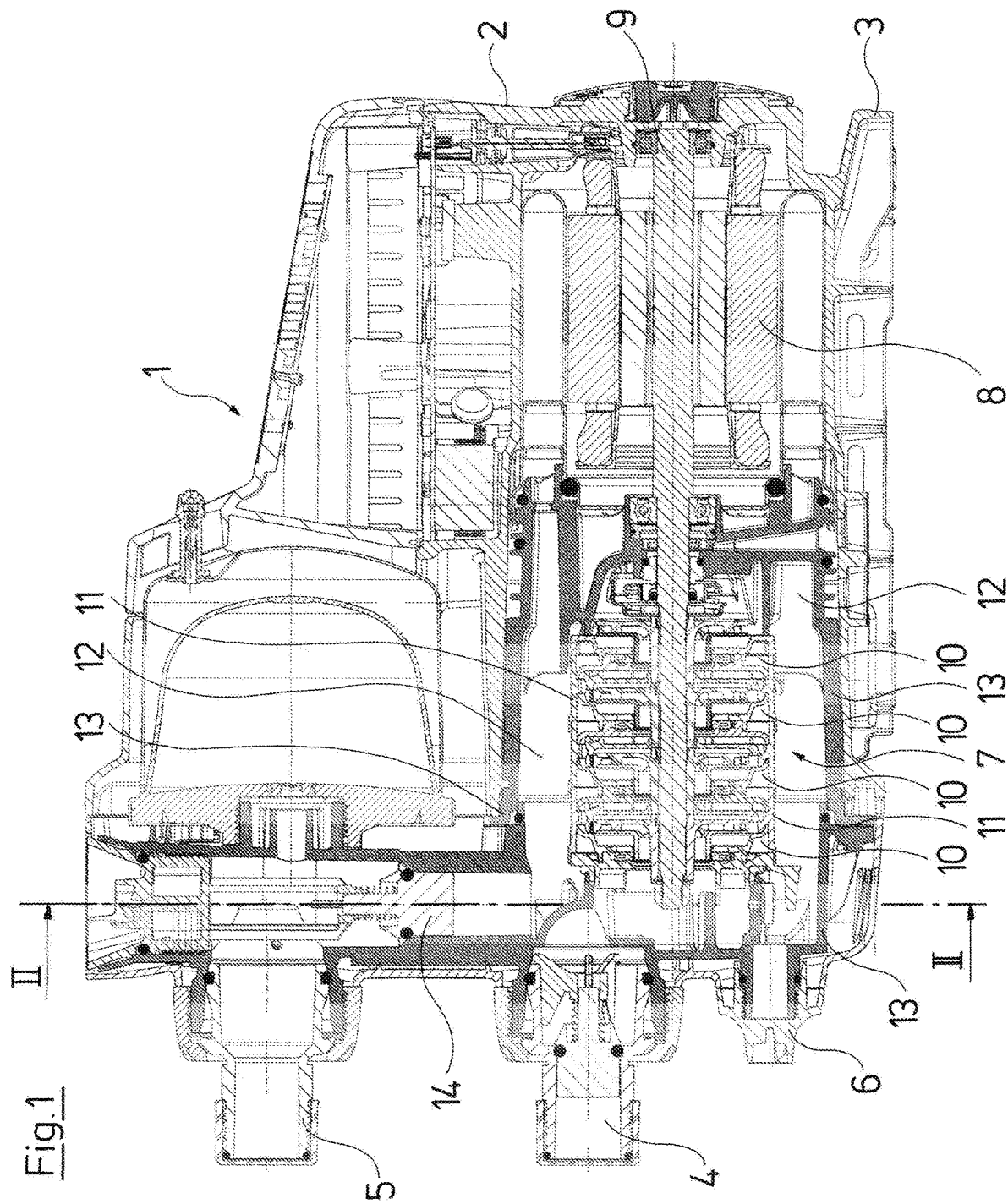
FIG. 1 is a sectional view of a domestic water works with a centrifugal pump according to the invention in a greatly simplified representation and in a longitudinal section along the section line I-I in FIG. 2.
Figure 2:
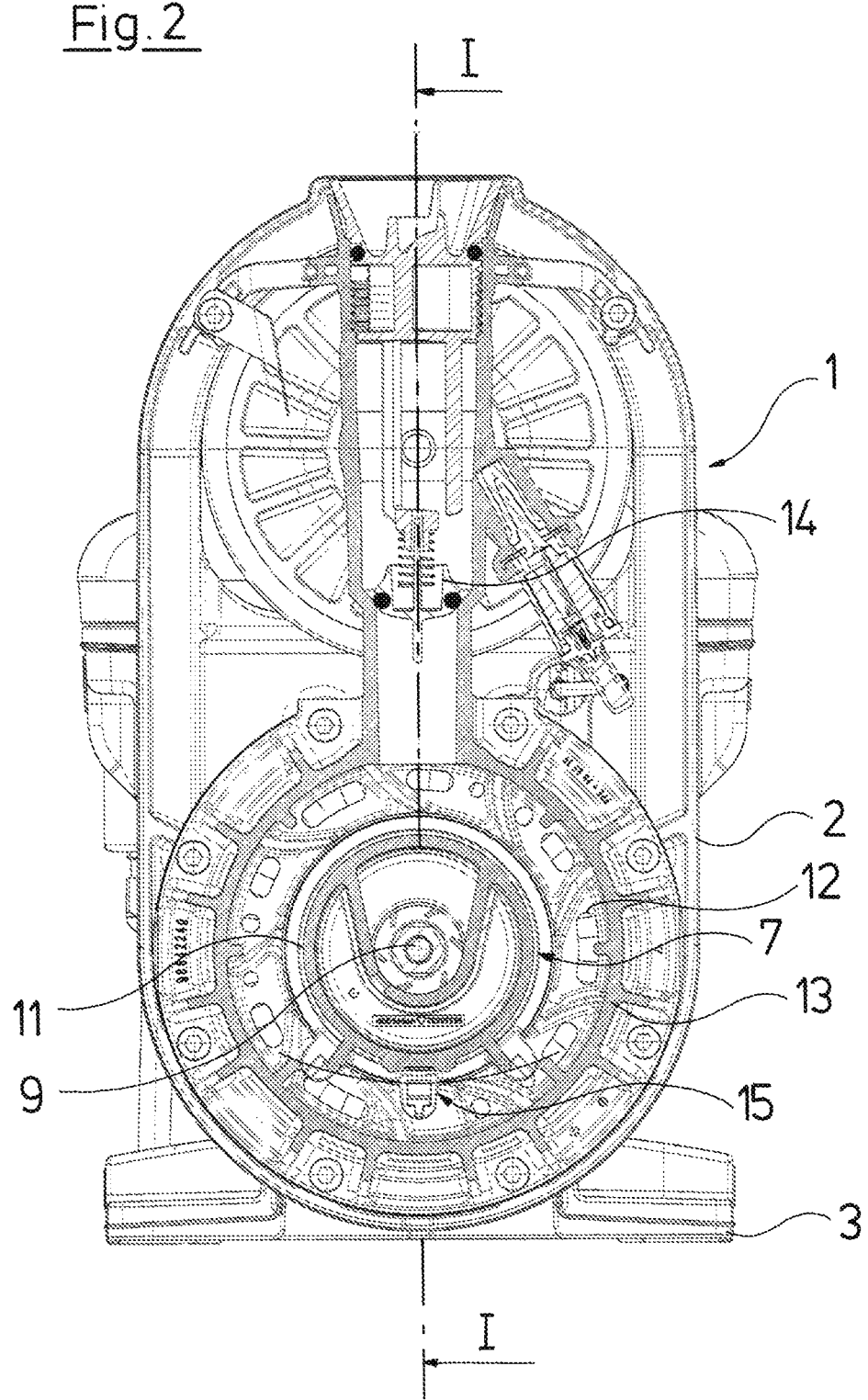
FIG. 2 is a cross sectional view along the section line II-II in FIG. 1.

Referring to the drawings, a domestic water works 1 comprises a housing 2, in which all components of the water works are integrated and which has a foot 3, with which the water works 1 stands on a floor surface in a house. In FIG. 1 on the left side of the housing 2 there is a suction connection 4 as well as a delivery connection 5 at a distance there above. A closeable drain opening 6 is provided below the suction connection 4.

The lower part of the housing 2 is filled out by a multistage centrifugal pump 7 and an electric motor 8. Pump 7 and motor 8 are arranged in a lying manner with their shaft 9 in horizontal position in operation. The shaft 9 bears the rotor of the electric motor 8 on one part and impellers 10 of the centrifugal pump 7 on the other part.

The centrifugal pump 7 has four stages each comprising an impeller 10 and a surrounding diffuser forming the inner wall 11 of an annular space 12, whose outer wall is formed by the pump casing 13. In operation, water gets through the suction connection 4 into the pump casing 13, thus to the suction port of the pump 7, from there subsequently through the individual pump stages up to the last pump stage, from which the main delivery flow is redirected about 180° into the annular space 12 between the cylinder wall 11 and pump casing 13. From there the flow goes upward through a non-return valve 14 to the delivery connection 5 of the water works.

During operation when the necessary pressure at the delivery connection 5 has been obtained and no further fluid flow is needed the electric motor 8 is turned off which makes the pump 7 stop. The pressure on the delivery connection 5 is held by the closed non-return valve 14. However, the head of water to the suction connection 4 may be interrupted in this situation. For recovering the water head when starting the pump again it is necessary that there is enough water in the pump stages, otherwise self-priming of the pump 7 will not be possible. When the pump 7 has stopped the water in the pump stages will level between all pump stages. This pressure controlled valve 15 is normally opened when the differential pressure is low, so that fluid can pass through the bypass 16. When the pump 7 runs the water in pump stages will recirculate through the bypass valve 16, during this process the head of water will be restabilized, and finally the differential pressure between suction side and pressure side is high and closes the valve 15.

Figure 3:
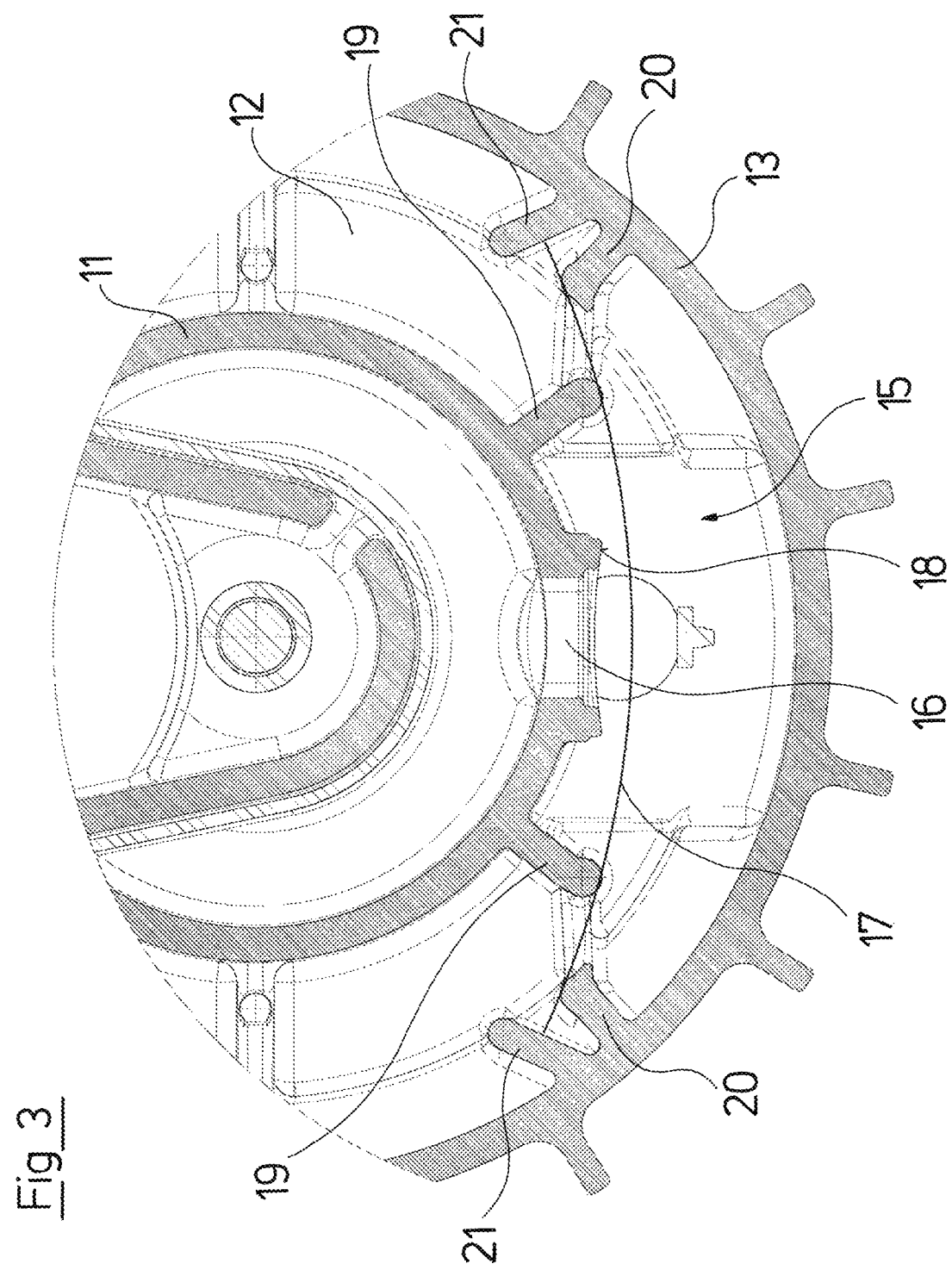
FIG. 3 is a detail view concerning the leaf spring valve of FIG. 2 in an enlarged view.

As this bypass 16 has to be closed during operation of the pump 7 this valve 15 is arranged to be closed by the fluid running through the bypass 16 and the pressure between the pressure side and the suction side of the centrifugal pump 7 in operation. If the centrifugal pump 7 is not in operation and the pressure drops down then the valve 15 will open the bypass 16. This valve 15 is a leaf spring valve comprising a leaf spring 17 and a valve seat 18 at the end of the bypass 16. The leaf spring 17 can be best seen from FIG. 3. This rectangular sheet 17 made from spring steel is pretensioned in its inherent opened position which can be seen in FIG. 3. There are projections 19, which extend radially from the cylinder wall 11 and which form a support for the leaf spring 17. There are further projections 20 which extend radially from the outer wall of the pump casing 13 into this annular space 12. There are further projections 21 which surround the projections 20 and also extend inversely from the cylinder wall of the pump casing 13. These projections 21 are arranged for fixing the leaf spring 17 in its longitudinal direction. The projections 20 form a support for the leaf spring 17. These projections 19, 20 and 21 support the leaf spring 17 in its pretensioned position, in which the valve 15 is opened (FIG. 3) and inherently stable, that means if there are no external fluids caused hydraulic forces, the leaf spring 17 stays in this opened position as can be seen in FIG. 3. In this position the leaf spring 17 is pretensioned. For closing the valve 15 there has to be a flow through the bypass 16. This flow and the differential pressure between this annular space 12 and the suction side of the pump 7 causes the leaf spring 17 to be moved in the direction of the valve seat 18 until the valve seat 18 is closed by the leaf spring 17. In this closed position there is no more flow but only a differential pressure of the pump 7 between the pressure side and the suction side which holds the valve 15 closed. As long as this differential pressure exists, the closed position of the leaf spring 17 is inherently stable as the position is defined by the valve seat 18 opposite to the middle of the leaf spring 17 and by the projections 19 which are the supports for the leaf spring 17 in the closed position.

To avoid this loud clack noise when the leaf spring valve 15 closes according to this invention the leaf spring valve 15 is arranged for soft closing—dampened closing—wherein the leaf spring valve 15 includes dampening means as shown by way of example according to the embodiments shown in the FIGS. 4-9. In the opened position, in which the leaf spring 17 is pretensioned, the leaf spring 17 is shown in solid lines in FIGS. 4-9. In the closed position, when the leaf spring 17 completely closes the valve seat 18, the leaf spring 17 is shown in a fine line with a dashed line. Further on there is a preclosed position, which is a semistable position. The leaf spring 17 in this position is shown in a dotted line. In all variations of the FIGS. 4-9 the opened position is indicated with a the preclosed position with b and the closed position with c.

Figure 4:
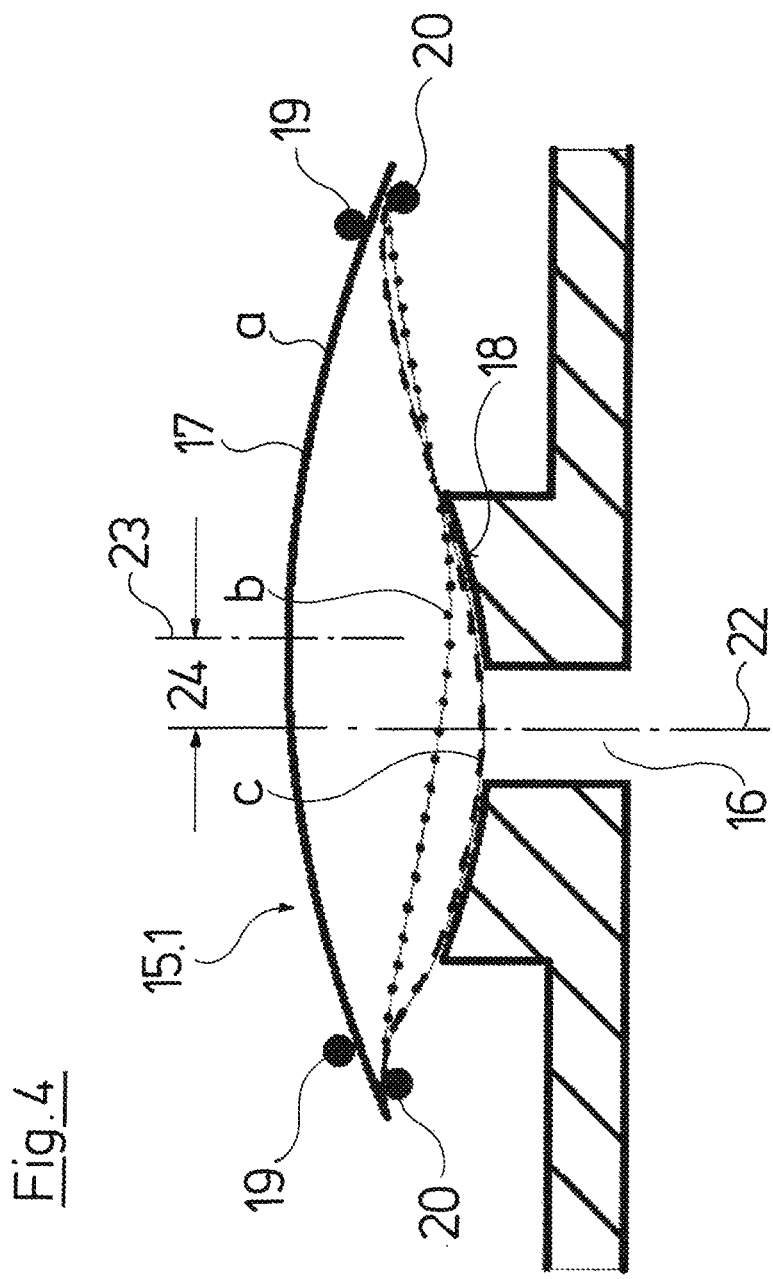
FIG. 4 is a schematic cross sectional view showing one of different embodiments of leaf spring valves according to the invention.

In the embodiment of the dampening means according to FIG. 4 the valve seat 18 which is arranged symmetrically around the middle of the bypass 16 is arranged offset to the middle 23 of the leaf spring 17. This offset 24 causes the leaf spring 17, on a path of the leaf spring 17 from the opened position a to the closed position c, to touch the valve seat 18 at one boarder first. In this position the leaf spring 17 has reached the preclosed position b as the leaf spring 17 touches the margin of the valve seat 18. This margin acts as a support, the effective lengths of the leaf spring 17 is shortened. This effects that the remaining effective part of the leaf spring 17 gets more stiff and needs higher forces to be moved into the closed position c. This slows down the movement and effects that the leaf spring 17 is guided smoothly in this closed position c. As soon as the pump 7 stops, when the differential pressure between suction side and pressure side of the pump drops down, the leaf spring valve 15.1 opens and the leaf spring 17 goes back to the pretensioned opened position a.

Figure 5:
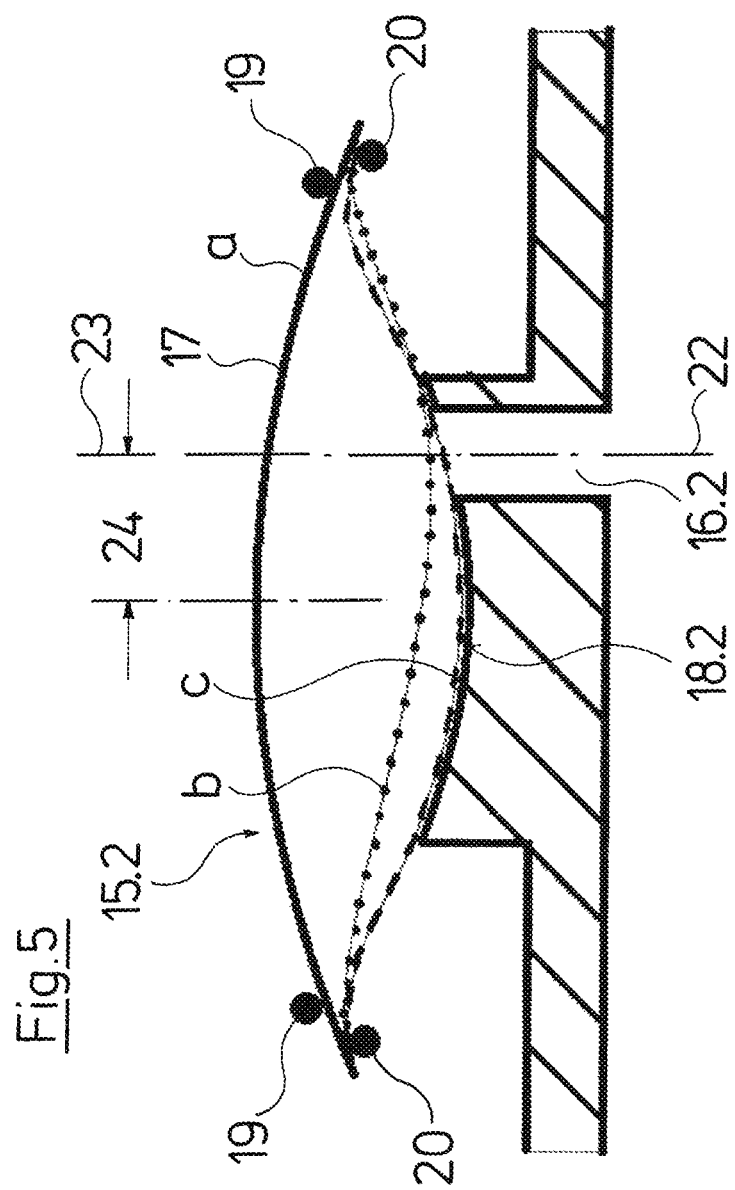
FIG. 5 is a schematic cross sectional view showing one of different embodiments of leaf spring valves according to the invention.

The embodiment of the dampening means according to FIG. 5 includes a similar arrangement of the leaf spring valve 15.1 of FIG. 4. This leaf spring valve 15.2 works in the similar manner as the leaf spring valve 15.1, the difference here is that the offset 24 is arranged by shifting the valve seat 18.2. The valve seat 18.2 is arranged eccentric which means that the bypass 16.2 with a bypass middle 22 is arranged with an offset 24 to the middle 23 of the leaf spring 17 and to the valve seat 18.2. The effect when moving from the opened position a to the preclosed position b and to the closed position c is similar as described before with the leaf spring valve 15.1 of FIG. 4.

Figure 6:
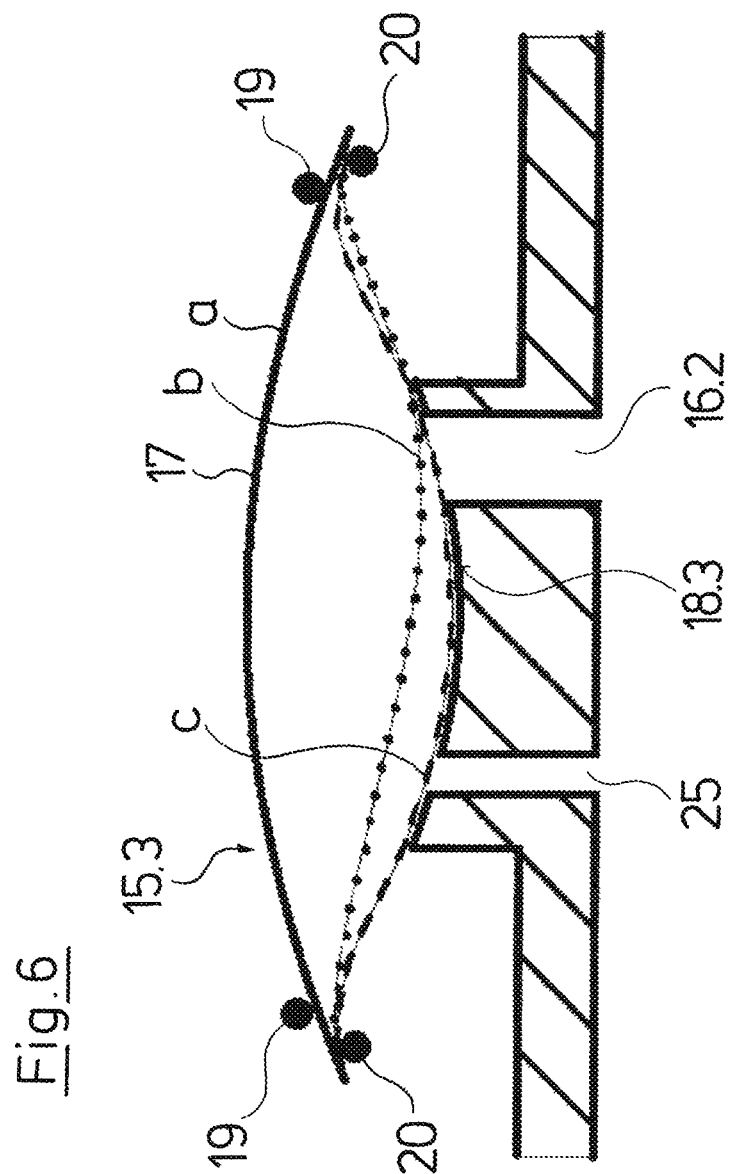
FIG. 6 is a schematic cross sectional view showing one of different embodiments of leaf spring valves according to the invention.

The embodiment of a leaf spring valve 15.3 with of the dampening means according to FIG. 6 has a valve seat 18.3 similar to the valve seat 18.2. However, there is a bypass 25 arranged beneath the bypass 16.2 which bypass 25 is smaller than the bypass 16.2 but also distanced from the middle 23 of the leaf spring 17 and the valve seat 18.3. The effect of this arrangement is that the leaf spring 17, moving to the valve seat 18.3, first closes a bypass 16.2. As this bypass 25 is still opened when the bypass 16.2 is closed, there is the double effect on the one hand, that a higher force is needed to completely close the valve and on the other hand that the bypass 25 holds a small short circuit which lowers the differential pressure at the valve 15.3. This makes the valve close smoothly.

Figure 7:
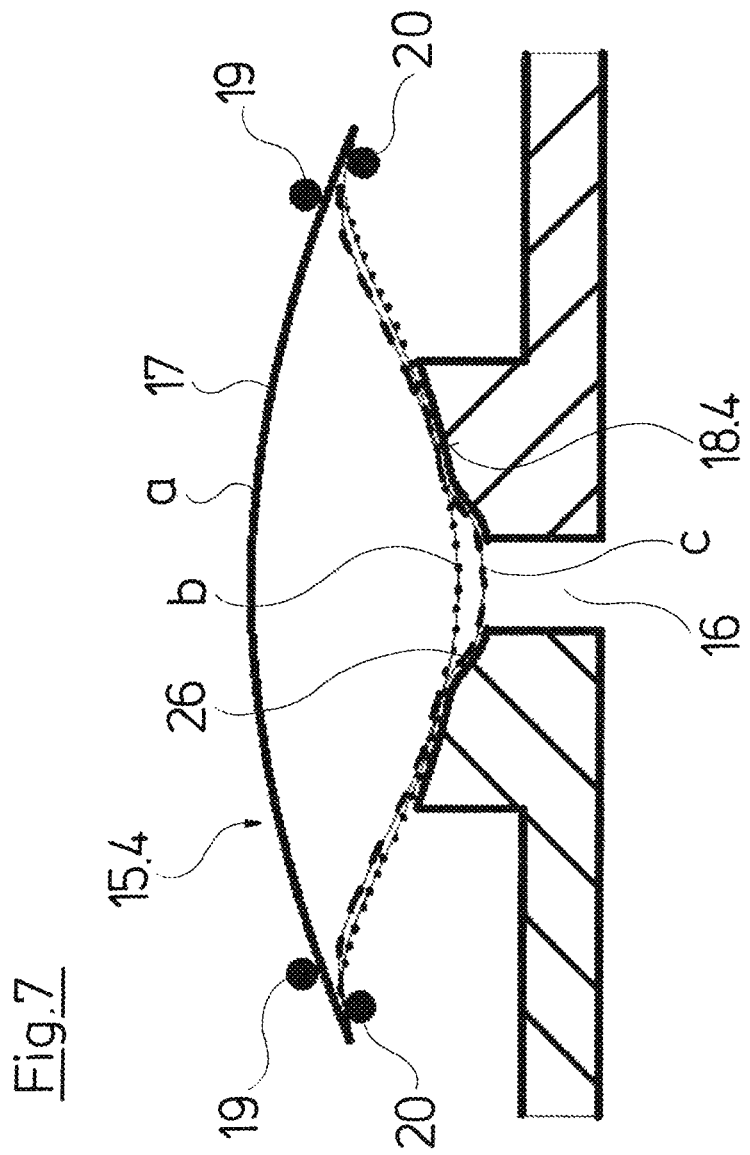
FIG. 7 is a schematic cross sectional view showing one of different embodiments of leaf spring valves according to the invention.

In the embodiment of the dampening means according to FIG. 7, the leaf spring valve 15.4 has a special valve seat 18.4. This valve seat 18.4 is structured on two levels. On the first level the valve seat 18.4 has a bigger diameter and radial channels within the seat so that when the leaf spring 17 moves to the preclosed position b fluid is still running between the valve seat 18.4 and the leaf spring 17 through these channels. The movement of the leaf spring 17 however is slowed down as the middle part of the leaf spring 17 which is needed to close the inner part 26 of the valve seat 18.4 has a relative short effective lengths. It needs bigger hydraulic forces for reaching this inner part 26 when it is in the closed position c and fluid is no longer running through the bypass 16. Additionally the part surrounding the inner part 26 of the valve seat 18.4 can be equipped with a shock absorbing material which is arranged like an intermittent ring.

Figure 8:
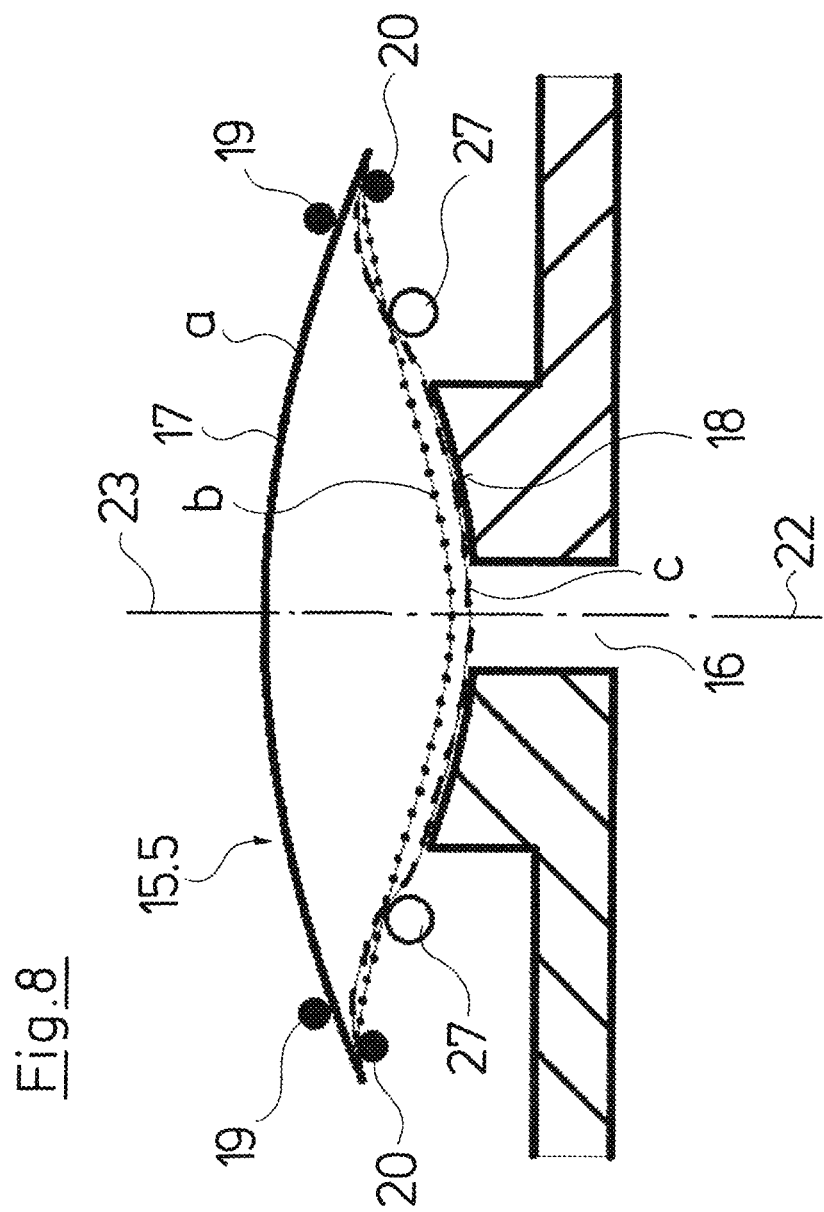
FIG. 8 is a schematic cross sectional view showing one of different embodiments of leaf spring valves according to the invention.

In the embodiment of the leaf spring valve 15.5 with the dampening means according to FIG. 8 there are arranged shock absorbers 27 near the valve seat 18 with the bypass 16 symmetrically in the middle of the valve seat 18 and the leaf spring 17. These shock absorbers 27 have a cylindrical form and are arranged as can be seen in FIG. 8 beneath and above the valve seat 18 in a manner that the leaf spring 17 when moving from the opened position a to the closed position c reaches a preclosed position b, where the leaf spring 17 is supported by these shock absorbers 27. These shock absorbers 27 form a stopping support for the leaf spring 17. This support effects that the effective length of the leaf spring 17 is reduced so that higher forces are needed to bring the valve spring 17 into the closed position c. This slows down the movement of the leaf spring 17 and makes for a soft closing—a dampened closing.

Figure 9:
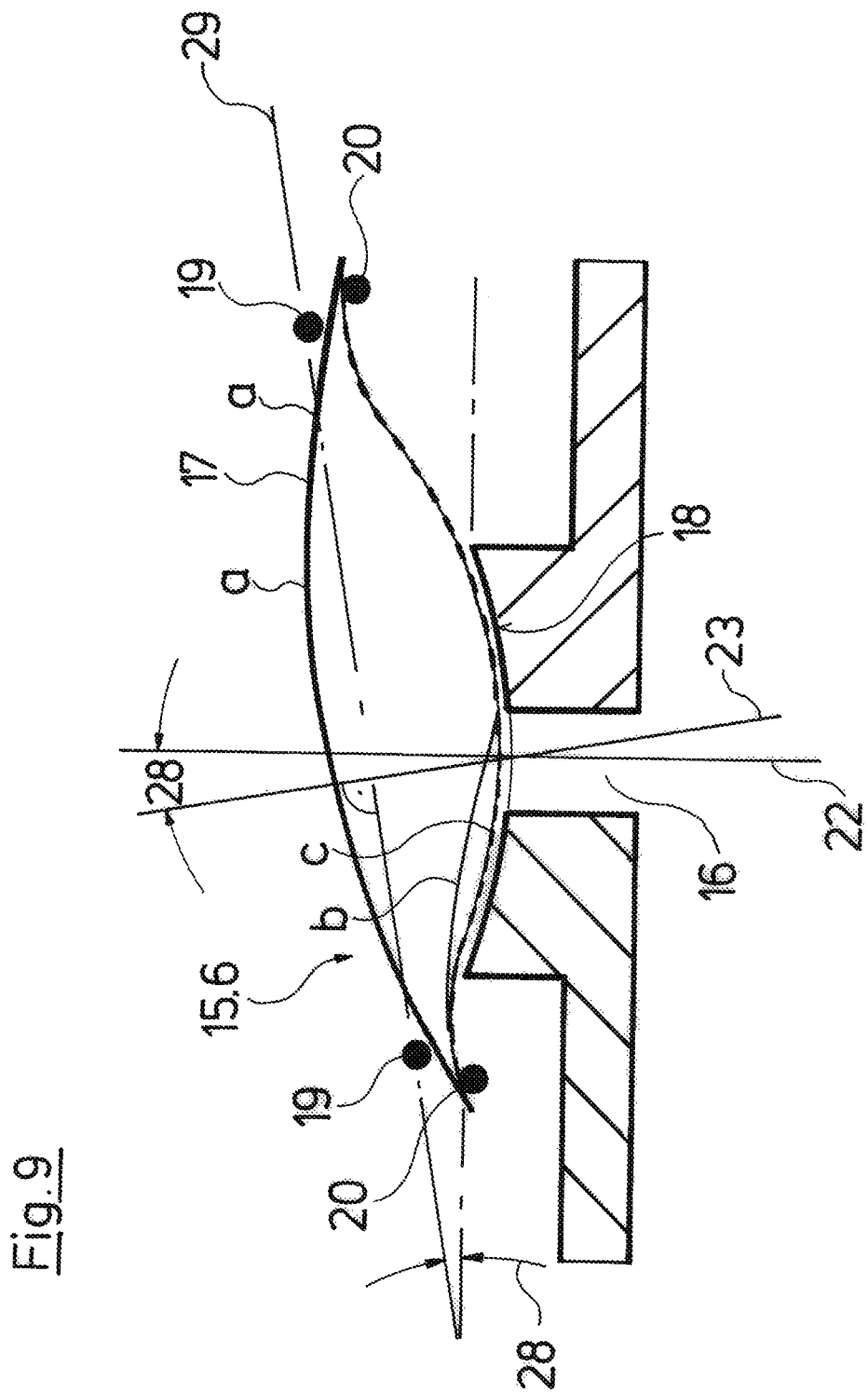
FIG. 9 is a schematic cross sectional view showing one of different embodiments of leaf spring valves according to the invention.

FIG. 9 shows an embodiment of a leaf spring valve 15.6 with the dampening means in which the leaf spring 17 is not arranged perpendicular to the valve seat 18 but at an angle 28 to a plane 29 parallel of the support 19 of the leaf spring 17. This arrangement has the effect that the leaf spring 17 when moved by hydraulic forces from an opened pretensioned position a to a closed position c does not close the bypass 16 at once but touches a side part of the valve seat 18 first and stag in a preclosed position b, or is at least slowed down to softly move into the closed position c.

The afore-mentioned embodiments with the dampening means according to the FIGS. 4-9 show examples, how the smooth—dampened—closing effect according to this invention could be achieved. It is clear that there are several other dampening means arrangements which are not described but which work according to same effect which is to slow down the motion of the leaf spring when it is in a preclosed position b or a preclosed region to have the effect that the complete closing to the position c is smoothly done to minimize noise either caused by water hammer or by striking of the leaf spring 17 to the valve seat 18.

While specific embodiments of the invention have been shown and described in detail to illustrate the application of the principles of the invention, it will be understood that the invention may be embodied otherwise without departing from such principles.

APPENDIX

List of reference designations

| | |
|---|---|
| 1 | domestic water works |
| 2 | housing |
| 3 | foot of the housing |
| 4 | suction connection |
| 5 | delivery connection |
| 6 | drain opening |
| 7 | centrifugal pump |
| 8 | electric motor |
| 9 | shaft |
| 10 | impeller |
| 11 | cylinder wall |
| 12 | annular space |
| 13 | pump casing |
| 14 | non-return valve |
| 15 | leaf spring valve |

APPENDIX-continued

List of reference designations

| | |
|---|---|
| 15.1 | leaf spring valve FIG. 4 |
| 15.2 | leaf spring valve FIG. 5 |
| 15.3 | leaf spring valve FIG. 6 |
| 15.4 | leaf spring valve FIG. 7 |
| 15.5 | leaf spring valve FIG. 8 |
| 15.6 | leaf spring valve FIG. 9 |
| 16 | bypass |
| 16.2 | bypass FIG. 5 |
| 17 | leaf spring |
| 18 | valve seat |
| 18.2 | valve seat FIG. 5 |
| 18.3 | valve seat FIG. 6 |
| 18.4 | valve seat FIG. 7 |
| 19 | projection |
| 20 | projection |
| 21 | projection |
| 22 | middle of bypass |
| 23 | middle of leaf spring |
| 24 | offset |
| 25 | further bypass |
| 26 | inner part |
| 27 | shock absorbers |
| 28 | angle |
| 29 | plane |
| a | opened position |
| b | preclosed position |
| c | closed position |

What is claimed is:

1. A centrifugal pump comprising:
one or more pumping stages;
a pressure controlled valve inside the centrifugal pump for supporting self-priming, the pressure controlled valve comprising a pretensioned leaf spring and a valve seat, the pretensioned leaf spring being configured to move from an opened position, in which the leaf spring is distanced from the valve seat to a closed position, in which the pretensioned leaf spring closes the valve seat, with a speed caused by fluid flow from said one or more pumping stages, the pretensioned leaf spring and the valve seat being arranged for dampening the speed of the pretensioned leaf spring caused by the fluid flow, wherein the pretensioned leaf spring has a preclosed position, in which the pressure controlled valve is partially closed;
a leaf spring support, wherein the valve seat is arranged eccentric with respect to a center of the leaf spring support.

2. The centrifugal pump according to claim 1, wherein the pretensioned leaf spring has at least one inherent stable position, which is the opened position and is forced into the preclosed and the closed positions by fluid forces acting on the pretensioned leaf spring.

3. The centrifugal pump according to according claim 1, wherein the pretensioned leaf spring has two inherent stable positions, the opened position and the closed position, wherein the pretensioned leaf spring is held in the closed position by fluid forces.

4. The centrifugal pump according to claim 1, wherein the pretensioned leaf spring has a semi-stable position which is the preclosed position.

5. The centrifugal pump according to claim 1, wherein the valve seat is distanced from the pretensioned leaf spring in the pre-closed position of the pretensioned leaf spring.

6. The centrifugal pump according to claim 1, further comprising a bypass in parallel to the pressure controlled valve, wherein the bypass is closed by the pretensioned leaf spring in the preclosing position of the pretensioned leaf spring.

7. The centrifugal pump according to claim 1, wherein the one or more pumping stages comprises a plurality of pumping stages to form a multistage centrifugal pump, wherein the pressure controlled valve is arranged between a suction side of the multistage centrifugal pump and a pressure side of the multistage centrifugal pump.

8. A domestic waterworks comprising a centrifugal pump, the centrifugal pump comprising:
   one or more pumping stages; and
   a pressure controlled valve inside the centrifugal pump for supporting self-priming, the pressure controlled valve comprising a pretensioned leaf spring and a valve seat, the pretensioned leaf spring being configured to move from an opened position, in which the pretensioned leaf spring is distanced from the valve seat to a closed position with a speed caused by fluid flow from said one or more pumping stages, in which the pretensioned leaf spring closes the valve seat, a center of the pretensioned leaf spring and a center of the valve seat being arranged offset relative to each other.

9. The domestic waterworks according to claim 8, wherein the pretensioned leaf spring has a preclosed position, in which the pressure controlled valve is partially closed.

10. The domestic waterworks according to claim 9, wherein the pretensioned leaf spring has at least one inherent stable position, which is the opened position and is forced into the preclosed and the closed positions by fluid forces acting on the pretensioned leaf spring.

11. The domestic waterworks according to claim 9, wherein the pretensioned leaf spring has two inherent stable positions, the opened position and the closed position, wherein the pretensioned leaf spring is held in the closed position by fluid forces.

12. The domestic waterworks according to claim 9, wherein the pretensioned leaf spring has a semi-stable position which is the preclosed position.

13. The domestic waterworks according to claim 8, further comprising a leaf spring support, wherein the valve seat is arranged off-center with respect to the leaf spring support.

14. A centrifugal pump comprising:
   a pumping stage;
   a pressure controlled valve in flow communication with said pumping stage, said pressure controlled valve including a valve seat and a leaf spring movable between a closed position and an opened position, said closed position having said leaf spring arranged against said valve seat and blocking fluid flow through said valve seat, said opened position having said leaf spring spaced from said valve seat and allowing the fluid flow through said valve seat, said leaf spring being pretensioned into said opened position, said pressure control valve being configured to move said leaf spring from said open position to said closed position with a speed caused by a force of fluid from said pumping stage, said valve seat defining a bypass for the fluid flow;
   dampening means for slowing said speed of said leaf spring as said leaf spring approaches said valve seat, said dampening means including a center of said bypass being offset from a center of said leaf spring.

15. The centrifugal pump in accordance with claim 14, wherein:
   said dampening means slows the speed of the leaf spring before the leaf spring closes the valve seat.

\* \* \* \* \*